(No Model.)
G. D. POHL.
CURD AGITATOR.
No. 597,859. Patented Jan. 25, 1898.
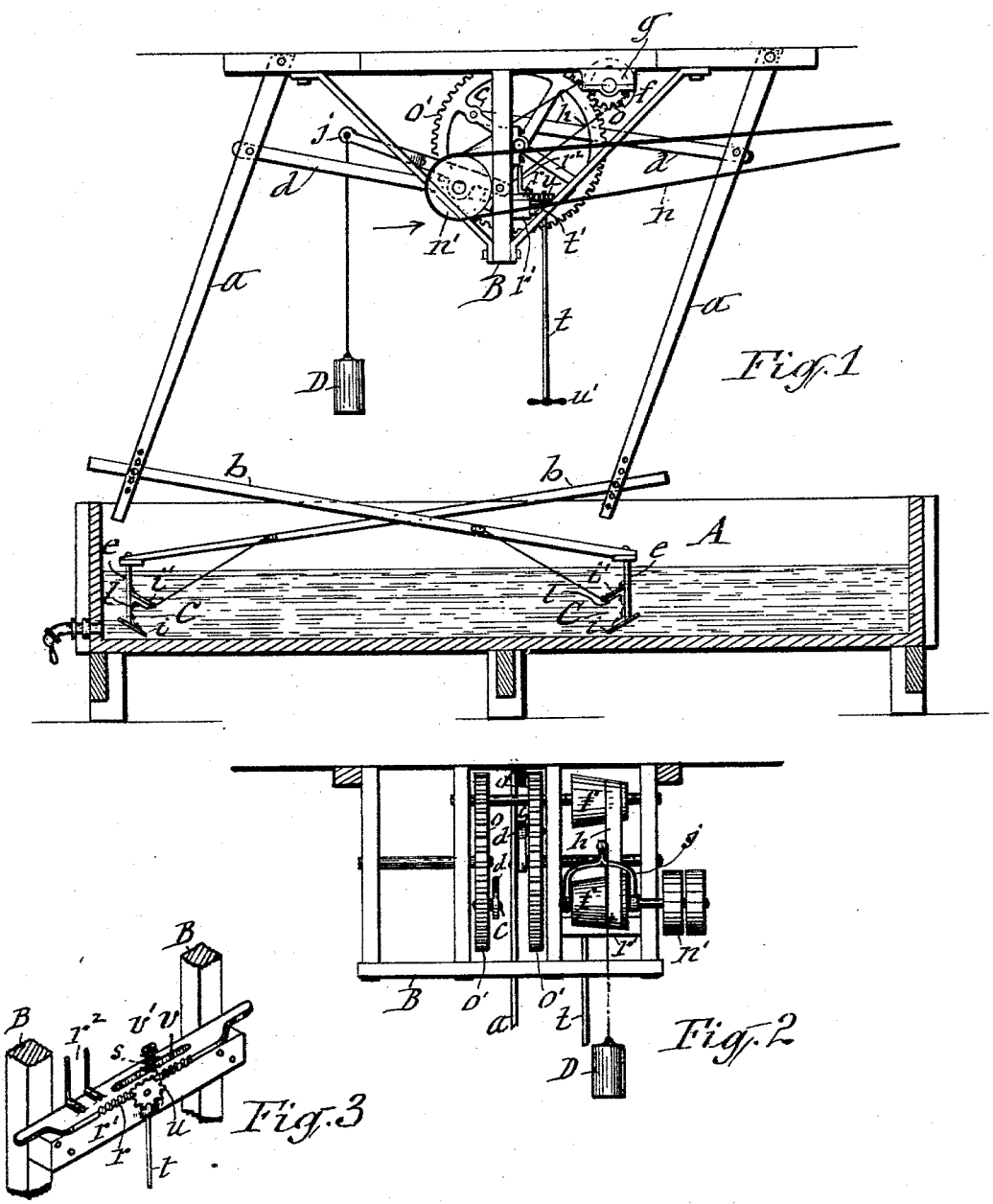
WITNESSES:
INVENTOR
George D. Pohl
By E. Laass
his ATTORNEY

UNITED STATES PATENT OFFICE.

GEORGE D. POHL, OF AVA, NEW YORK.

CURD-AGITATOR.

SPECIFICATION forming part of Letters Patent No. 597,859, dated January 25, 1898.

Application filed June 3, 1897. Serial No. 639,209. (No model.)

*To all whom it may concern:*

Be it known that I, GEORGE D. POHL, of Ava, in the county of Oneida, in the State of New York, have invented new and useful Improvements in Curd-Agitators, of which the following, taken in connection with the accompanying drawings, is a full, clear, and exact description.

This invention relates to the class of apparatus which is employed for the treatment of coagulated milk to separate the curd from the whey preparatory to manufacturing cheese from said curd. Said treatment is carried on in vats which are equipped with suitable means for gradually heating the milk to promote the coagulation thereof, after which it is cut up into small cubes by means of knives made for that purpose, and then the curd requires very careful stirring, which at first, owing to the fact that the curd is then very soft, must be slow and gradually accelerated, corresponding to the gradually-rising temperature of the curd, to prevent the curd from settling on the bottom of the vat, which settling causes the particles of curd to unite and it must then be again broken by force, and this latter operation produces an injurious result, usually called by dairymen "bleeding" of the curd, which subsequently causes a greater or less portion of the curd to go to waste with the whey.

The object of this invention is to effectually separate the whey from the curd with a minimum waste of the latter; and to that end the invention consists in the novel construction of the curd-agitators and means for operating the same, as hereinafter more fully described.

Figure 1 is a vertical longitudinal section of a curd-vat provided with my improved means for agitating the curd. Fig. 2 is an elevation of the actuating mechanism of the agitator, viewed in the direction indicated by the arrow in Fig. 1, and Fig. 3 is a detached perspective view of the mechanism for shifting the driving-belt.

Similar letters of reference indicate corresponding parts.

A represents the vat, in which is carried on the process of coagulating the milk and separating the whey from the curd.

C C denote the agitators proper, which are dragged back and forth in the vat from opposite ends to a point a short distance beyond the center of the length of the vat and are timed in their movement so as to cause them to approach and recede from each other to follow the other part way as it recedes from the central portion of the vat. This motion is attained by the following mechanism, to wit:

From the ceiling or other suitable elevated support over opposite ends of the vat are suspended the oscillatory levers $a\ a$, to the lower ends of which are pivotally connected the bars $b\ b$, which cross each other and extend toward the opposite end of the vat. To the free end of each of said bars is attached one of the agitators C proper, which embodies one of the salient features of my invention, hereinafter described.

Between the upper ends of the two levers $a\ a$ are two rotary cranks $c\ c$, which revolve in unison about a common center and are connected by pitmen $d\ d$ to the levers $a\ a$ near the pivoted ends thereof, so as to cause the free ends of said levers to swing a distance exceeding half of the length of the vat. The wrist-pins of the cranks are set less than one hundred and eighty degrees apart, or in such positions in relation to each other as to cause the levers to swing toward and from each other and alternately reverse their motion, one slightly in advance of the other. To the lower ends of the levers are pivotally connected the before-mentioned bars $b\ b$, to which the agitators C C are attached and are thereby reciprocated horizontally in the vat and caused to alternately approach and recede from each other. This movement is an essential feature of my invention, in that it effectually agitates the curd without danger of carrying it over the end of the vat. Each of the agitators C, I construct of a suitable skeleton frame or rack $e$, which extends across the interior of the vat A and has paddles $i$ and $i'$, attached at one edge thereto, so as to cause the paddles of each rack to face those of the other rack. The lower paddles $i$ are rigidly secured to the rack $e$, and a short distance above them are the paddles $i'$, which are hinged and free to oscillate from a horizontal to an inclined position, which latter is limited by stops $l\ l$, preferably on the rack and in position to arrest the downward movement of the paddles. The hinged paddles are formed of wood or other suitable light material to allow them to be lifted into horizontal position by the pressure of the curd on the backs of the paddles during the movement of the agitator toward the end of the vat.

In the operation of the described agitators the paddles $i$ $i'$ drop into inclined positions during the movement of the agitators from the end of the vat to the point past the center of the length thereof, and in passing through the curd the latter is forced upon the inclined paddles and over the tops thereof, and at the same time the paddles form at the rear of them eddies, into which the curd rushes from over the tops of the paddles and from the rear thereof. In the reverse movement of the agitators the hinged paddles $i'$ readily yield to the pressure of the curd against the backs thereof and are thus drawn in horizontal positions through the curd and caused to cut through the same in horizontal planes, while the fixed lower paddles $i$ stir the curd in the bottom portion of the vat. By subjecting the curd alternately to the before-described peculiar agitation and horizontal cutting operation the whey is effectually separated from the curd, and the yield of cheese is augmented.

Inasmuch as the operation of the agitators must be continuous during the process of separating the whey from the curd and has to be gradually accelerated in accordance with the gradual rising of the temperature of the curd it is essential to enable the person in charge of the apparatus to have perfect control of the actuating mechanism of the agitator, and for this purpose I employ the two cone-pulleys $f f$, which are placed reverse to each other and are connected by a driving-belt $h$. One of said pulleys is journaled in suitable stationary bearings $g$, while the other of said cone-pulleys is journaled in bearings on the fork of a lever $j$, which is pivotally connected at one end to the supporting-bracket B of the aforesaid actuating mechanism and has connected to its free end a suitable weight D, which serves to maintain the belt $h$, as well as the main driving-belt $n$, in the requisite tension to transmit motion. The pulley $n'$ of said main belt is attached to the shaft of the cone-pulley $f$, which has its bearings on the aforesaid lever $j$. To the shaft of the other cone-pulley are fastened two pinions $o$, which engage, respectively, two gear-wheels $o' o'$, having the crank-pins $c$ attached to them.

In order to afford perfect control of the speed of the agitators, I employ a belt-shifter consisting of a longitudinally-movable rack $r$, mounted on a supporting-bar $r'$, which is fastened horizontally to the bracket B. Said rack has attached to it the fork $r^2$, through which the belt $h$ passes. A vertical rod $t$ is suspended from a bearing $t'$, fastened to the supporting-bar $r'$, and to this rod is affixed a pinion $u$, which engages the rack $r$. Said rod is revoluble in its said bearing and provided at its lower end with a suitable handle $u'$, by means of which the person in charge can turn the rod and thereby cause the pinion $u$ to impart longitudinal movement to the rack $r$, which, by means of the fork $r^2$, shifts the belt $h$.

The described belt-shifter is more clearly shown in Fig. 3 of the drawings, in which $v$ represents a longitudinal slot in the rack, and $v'$ denotes a bolt which passes through said slot and is fastened to the supporting-bar $r'$. Said bolt serves to maintain the rack in engagement with the pinion $u$. To hold the rack down on the bar $r'$ without subjecting it to undue friction, I interpose between the rack and head of the bolt a spiral spring $s$.

What I claim as my invention is—

1. In combination with the vat, pendent oscillatory levers, one over each end portion of the vat, two rotary cranks, pitmen connecting said cranks with the aforesaid levers near the pivoted ends thereof to swing their free ends a distance exceeding half of the length of the vat, bars crossing each other over the vat and pivoted to the free ends of the aforesaid levers, and agitators connected to the free ends of said bars and dragged thereby to and from opposite ends of the vat, the aforesaid cranks being disposed less than one hundred and eighty degrees apart to cause the agitators to alternately approach and recede from each other, as set forth and shown.

2. In combination with the vat, a curd-agitator consisting of a horizontally-reciprocating rack extending across the interior of the vat, paddles pivoted at one edge horizontally to the rack, and free at the opposite edge, and stops supporting the paddles normally inclined from the rack, as set forth.

3. The combination, with the vat, of pendent oscillatory levers over the end portions of the vat, two cranks revolving about a common center over the center of the vat and having their wrist-pins less than one hundred and eighty degrees apart, pitmen connecting the cranks with the aforesaid levers, bars pivoted to the lower ends of the levers and extending lengthwise of the vat, agitators extending across the vat and dragged by the aforesaid bars back and forth in the vat from opposite ends to a point a short distance beyond the center of the length of the vat and timed in their movements by the aforesaid cranks so as to cause them to approach and recede from each other, and each to follow the other part-way as it recedes from the central portion of the vat, thereby thoroughly agitating the curd without danger of carrying it over the ends of the vat, substantially as set forth.

4. In combination with the vat, curd-agitators and mechanisms actuating said agitators, two reversely-disposed cone-pulleys, a driving-belt running on said pulleys and transmitting motion to the aforesaid actuating mechanism, a longitudinally-movable rack provided with means for shifting the aforesaid belt, a pinion engaging said rack, and manually-operated means for turning said pinion as and for the purpose specified.

5. In combination with the vat, curd-agitators and mechanisms actuating said agitators, a lever pivoted at one end to a stationary support and weighted at its free end, a cone-pulley pivoted to said lever, a reversely-disposed cone-pulley journaled in fixed bearings, a driving-belt connecting said cone-pulleys, a longitudinally-movable rack provided with means for shifting said belt, a pinion engaging said rack, and manually-operated means for turning said pinion and thereby shift the aforesaid belt, substantially as set forth.

In testimony whereof I have hereunto signed my name this 15th day of May, 1897.

GEORGE D. POHL. [L. S.]

Witnesses:
H. B. SMITH,
M. A. LEYDEN.